United States Patent [19]
Ehrnsberger et al.

[11] Patent Number: 5,961,105
[45] Date of Patent: Oct. 5, 1999

[54] FRICTIONAL DAMPER, IN PARTICULAR FOR WASHING MACHINES WITH SPINNING CYCLE

[75] Inventors: Manfred Ehrnsberger, Berg; Dieter Mayer, Sulzbach-Rosenberg; Reiner Rössner, Altdorf, all of Germany

[73] Assignee: Suspa Compart Aktiengesellschaft, Altdorf, Germany

[21] Appl. No.: 08/832,200

[22] Filed: Apr. 8, 1997

[30] Foreign Application Priority Data

Apr. 16, 1996 [DE] Germany ............................ 195 15 010

[51] Int. Cl.⁶ ........................................................ F16F 7/08
[52] U.S. Cl. ............................................. 267/216; 188/129
[58] Field of Search ............................... 188/129; 267/201, 267/205, 202, 203, 216, 133, 134, 196

[56] References Cited

U.S. PATENT DOCUMENTS

| | | | |
|---|---|---|---|
| 2,747,696 | 5/1956 | Blattner | 267/216 |
| 3,332,523 | 7/1967 | Chambers | 188/129 |
| 4,991,412 | 2/1991 | Bauer et al. | 188/129 |
| 5,549,182 | 8/1996 | Ehrnsberger et al. | 188/129 |

FOREIGN PATENT DOCUMENTS

| | | |
|---|---|---|
| 0 336 176 | 6/1993 | European Pat. Off. . |
| 0 407 755 | 4/1994 | European Pat. Off. . |
| 0869774 | 2/1942 | France ............................... 267/216 |
| 285 746 | 3/1985 | Spain . |
| 0416857 | 9/1934 | United Kingdom ................... 267/216 |

*Primary Examiner*—Matthew C. Graham
*Attorney, Agent, or Firm*—Browdy and Neimark

[57] ABSTRACT

A frictional damper, in particular for spinner-type washing machines, comprises a tubular housing and a tappet guided displaceably in the housing, articulation elements being mounted on the free end of the housing and the tappet. A damping element is formed on the end of the housing on the tappet exit side, in which a damping element carrying a friction lining is disposed displaceably in the direction of the central longitudinal axis. The damping element bears against prestressed helical compression springs.

11 Claims, 2 Drawing Sheets

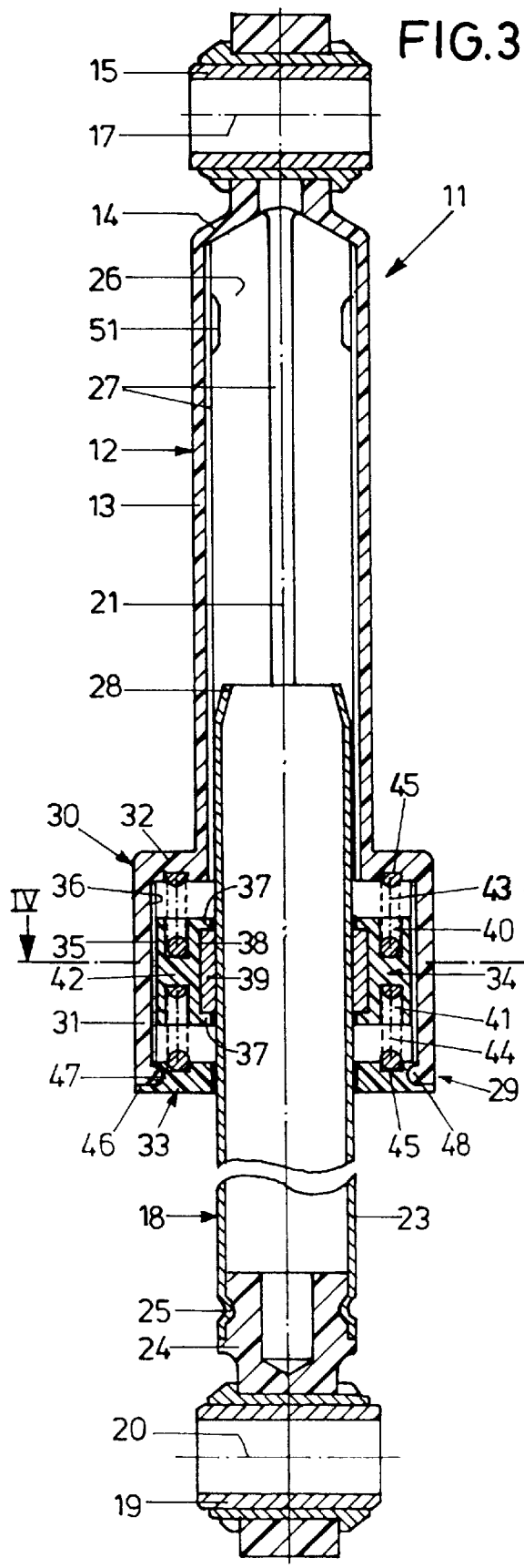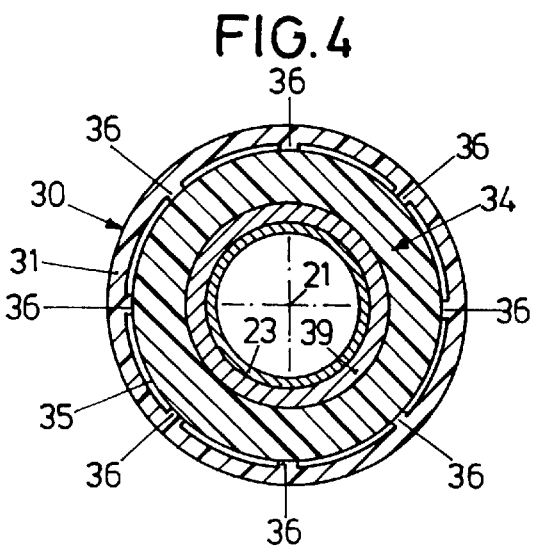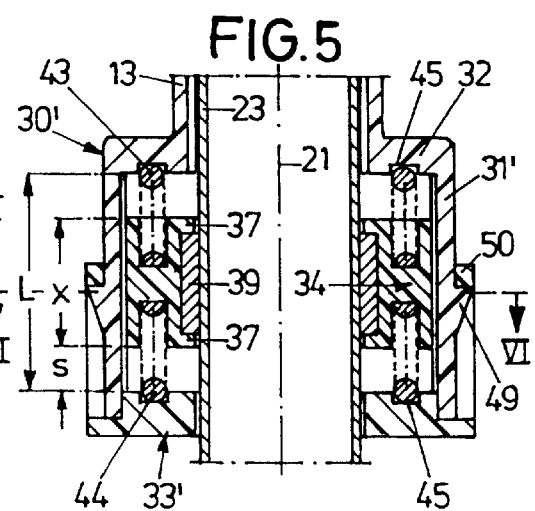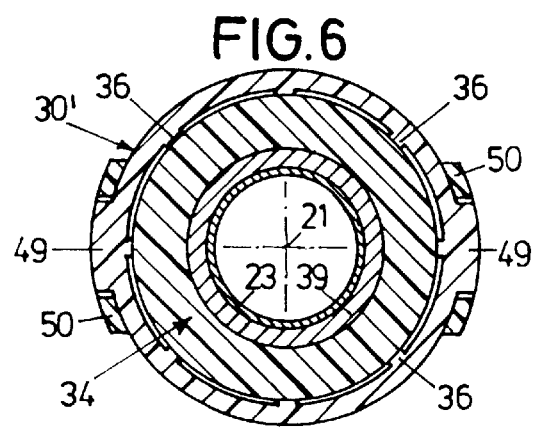

FRICTIONAL DAMPER, IN PARTICULAR FOR WASHING MACHINES WITH SPINNING CYCLE

BACKGROUND OF THE INVENTION

1. Field of the Invention

The invention relates to a frictional damper, in particular for spinner-type washing machines, comprising a tubular housing; a tappet guided displaceably in the housing and projecting over an end of the housing; articulation elements mounted on the free end of the housing and of the tappet; a damping housing, which is formed on the end of the housing on the tappet exit side and in which a friction lining is disposed, bearing with friction against the tappet.

2. Background Art

A frictional damper of the generic type is known from Spanish utility model 285 746, in which the tubular housing has an expanded receiving section in the vicinity of the end on the tappet exit side, which is closed toward the tappet side. The tappet is guided on the entire inside wall of the tubular housing. The tubular housing and/or the tappet have a vent in the vicinity of the respective free end. This frictional damper is very simple in structure; as a result of the way of guidance in combination with the way the damping lining is arranged, no defined frictional conditions can be attained. Furthermore, whistling occurs during operation.

It is known from EP 0 336 176 B1 to modify the mentioned frictional damper in such a way that the friction lining is disposed in a special damping housing, which is inserted into the tubular housing from the end on the tappet exit side, where it is fixed axially in the direction of its longitudinal axis. This makes the friction lining placed and held in a special damping housing a special aggregate which may vary in design for the generation of varying frictional conditions, but is insertable into an otherwise identical frictional damper.

A frictional damper for spinner-type washing machines is known from EP 0 407 755 B1, having a housing with a substantially circular cylindrical inside wall and a tappet which is displaceable coaxially in the housing, one end of which is extracted from the housing and the other end of which is provided with at least one damping piston. The damping piston is disposed on a bearing section of the tappet displaceably between spring elements that bear against stops. The spring elements may vary in length and adjustment, for retarded driving of differing friction linings to be obtained. This embodiment is to provide for amplitude-responding vibration damping, and for a soft transition in particular during the change of direction of the motion of the tappet relative to the housing. This is meant to make the system work with little noise.

U.S. Pat. No. 5,549,182 teaches to embody fictional dampers of the generic type as spring elements with pre-stressed compression springs. In this way it is ensured that the maintenance of a soft, quiet transition at the reversal points is accompanied with uniform damping over the full stroke in the case of high oscillation amplitudes and with substantial freedom from damping in the case of low oscillation amplitudes.

SUMMARY OF THE INVENTION

It is the object of the invention to embody a frictional damper of the generic type such that a soft, quiet transition is attained at the reversal points.

According to the invention, this object is attained by the features wherein a damping element candying the friction lining is disposed in the damping housing displaceably in the direction of the axis, and wherein the damping element is displaceable against prestressed compression springs which are supported on abutments of the damping housing.

Further features, advantages and details of the invention will become apparent from the ensuing description of two exemplary embodiments, taken in conjunction with the drawing.

BRIEF DESCRIPTION OF THE DRAWING

FIG. 3 is a longitudinal section of a vibration damper according to the invention, FIG. 4 is a cross-section through the vibration damper on the section line IV—IV on an enlarged scale as compared with FIG. 3, FIG. 5 is a partial longitudinal section through an embodiment of a vibration damper on an enlarged scale and modified as compared with FIG. 3, and FIG. 6 is a cross-section through the modified embodiment of a vibration damper corresponding to the section line VI—VI of FIG. 5.

DESCRIPTION OF THE PREFERRED EMBODIMENTS

Figure 1:
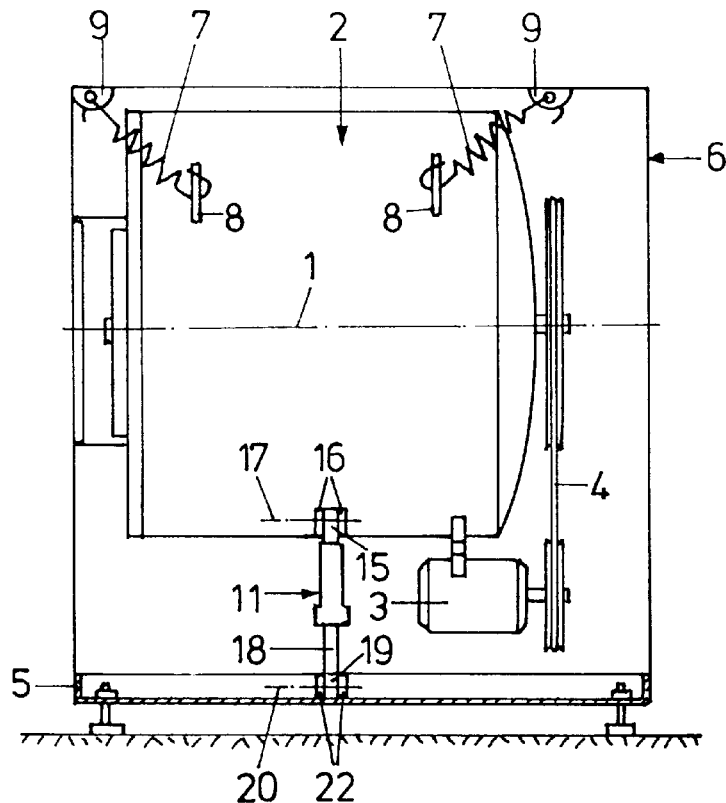
FIG. 1 is a diagrammatical illustration of a side view of a rotary-drum washing machine.
Figure 2:
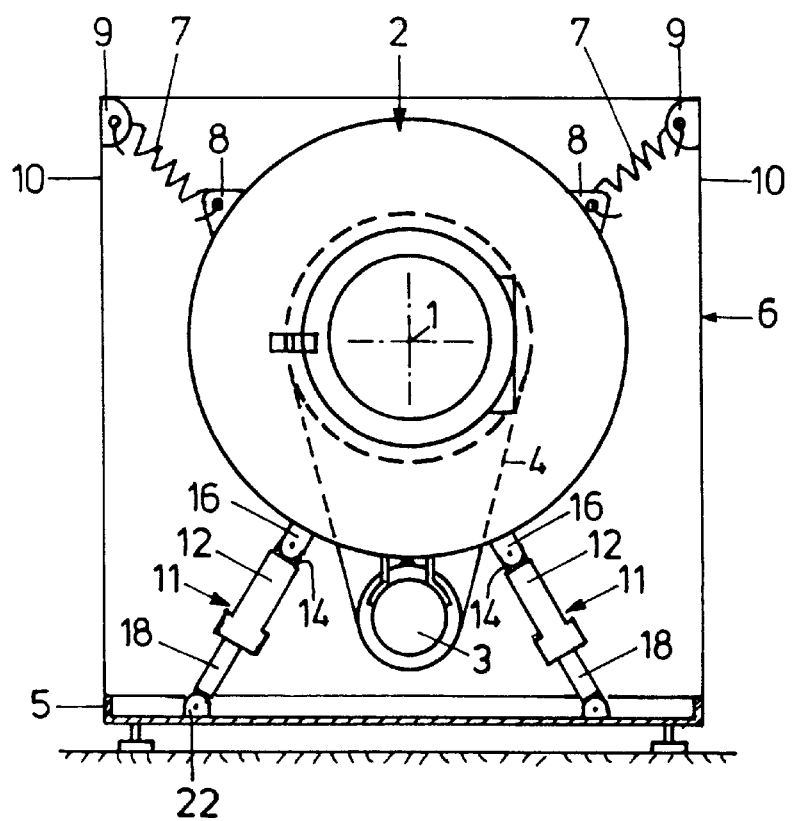
FIG. 2 is a front view of the rotary-drum washing machine according to FIG. 1.

A rotary-drum washing machine with a horizontal drum axis 1 has an oscillatory washer unit 2 with a drive motor 3 driving the washing drum, not shown in detail, by way of a belt drive 4. Further components connected with the washer unit 2, such as a transmission, are not shown for reasons of simplicity. The oscillatory washer unit 2 is suspended by means of helical tension springs 7 on a washing machine housing 6 supported on a machine stand 5 formed by a main frame. The tension springs 7 are on the one hand secured to loops 8 arranged in the upper area of the washer unit 2. On the other hand, they are suspended on loops 9 provided on side walls 10 of the housing 6.

Instead of the washer unit 2 being suspended on tension springs 7, a known support of the washer unit 2 may be provided by way of so-called telescopic spring struts (not shown) on the machine stand 5, as known from U.S. Pat. No. 4,991,412. It is of decisive importance that the suspension or support of the washer unit 2 is freely oscillarory.

Further, vibration dampers 11 are arranged between the washer unit 2 and the machine stand 5, which are frictional dampers.

In the example of embodiment specified in the following, the vibration damper 11 has a housing 12. The housing 12 essentially consists of a cylindrical tube 13 closed at one end by means of a bottom 14. On the outside of the bottom 14, an articulated bush 15 is provided as an articulating element, by means of which the vibration damper 11 is mounted on a bearing 16 on the washer unit 2 such that the vibration damper 11 is arranged to be pivotable relative to the washer unit 2 about a pivot axis 17 which extends parallel to the drum axis 1.

Each vibration damper 11 further has a tappet 18, having in like manner at its outer end an articulated bush 19, of which the pivot axis 20, in the same way as the pivot axis 17, is perpendicular to the central longitudinal axis 21 of the respective vibration damper 11. By this articulated bush 19 the vibration damper 11 is pivotably seized in a bearing 22 arranged on the machine stand 5 in such a manner that the pivot axis 20 also extends parallel to the drum axis 1.

The tappet 18 substantially consists of a comparatively thin-walled metal pipe 23, the end of which is located outside the housing 12 and is provided with the articulated bush 19, on which a cover 24 is formed, with which this articulated bush 19 is connected by means of a crimp 25 on the pipe 23. As opposed to this, the housing 12 is injection-molded in one piece from plastic material.

On its inside wall 26, the housing 12 has guide ribs 27, which project radially inward and run parallel to the axis 21, and which extend substantially over the length of the inside wall 26. These guide ribs 27 are disposed at equal angular sections relative to each other, there being at least three guide ribs; four guide ribs 27 are provided in the exemplary embodiment, disposed at a distance of 90° to each other. For the insertion of the tappet 18 into the housing 12 to be facilitated, the pipe 23 is provided with a radial necking 28 at its end opposite to the articulated bush 19.

At the end 29 on the tappet exit side, which is opposite to the articulated bush 15, the housing 12 has a damping housing 30 consisting of an annular cylindrical housing section 31 and a stop collar 32. The annular cylindrical housing section 31 has an inside diameter greater than what corresponds to the outside diameter of the pipe 23 of the tappet 18. The stop collar 32 is formed by a transition area between the housing section 31 and the pipe 13, which is formed in one piece with the damping housing 30 and—as mentioned—is made from plastic material.

At its free end opposite to the stop collar 32, the damping housing 30 is closed by an annular cover 33. In the damping housing 30, an annular damping element 34 is disposed displaceably in the direction of the axis 21. It has a circular cylindrical outer surface 35 which is guided, with slight clearance, on guide ribs 36 of the damping housing 30 that run parallel to the axis 21. On its inside turned toward the pipe 23 of the tappet 18, it is provided with annular stop flanges 37 at both ends, a cylinder ring recess 38 being formed between the flanges 37. A friction lining 39 is disposed in this recess 38, consisting for instance of a polyurethane foam, the open or opened cells of which housing a lubricant. The stop flanges 37 prevent the friction lining 39 from slipping out of the recess 38 in the direction of the axis 21. The friction lining 39 bears with friction against the pipe 23 of the tappet 18.

Between the recess 38 and the outer surface 35 of the damping element 34, annular cylindrical recesses 40, 41 are formed concentrically of the axis 21, of which the recess 40 is open toward the stop collar 32 and the other recess 41 toward the cover 33. An annular rib 42 is located between the two recesses 40, 41.

From its two axial ends, the damping element 34 is loaded by prestressed helical compression springs 43, 44, of which one helical compression spring 43 penetrates into the recess 40 and supports itself on the annular rib 42. It also supports itself on the stop collar 32. The other helical compression spring 44 penetrates into the recess 41, from there supporting itself on the annular rib 42. Its other end supports itself of the cover 33. For the helical compression springs 43, 44 to be guided laterally firmly in the stop collar 32 on the one hand and in the cover 33 on the other, these are provided with annular, groove-type recesses 45. Consequently, the stop collar 32 and the cover 33 are the abutments for the compression springs 43, 44.

The two helical compression springs 43, 44 are substantially of identical design. When they are completely compressed, they submerge largely, but not completely in the respective recess 40 or 41, i.e. the damping element 34 can move substantially over the free length L of the damping housing 30 between the latter's stop collar 32 and cover 33. As regards the maximally possible length s of the damping element 34 from its central position of rest shown in the drawing, it can be said that s is slightly less than (L-X)/2, X being the length of the damping element 34 in the direction of the axis 21. The compression springs 43, 44 are dimensioned and prestressed such that when one compression spring 43 or 44 is completely compressed, i.e. when the damping element 34 is completely displaced by the length s out of its central position of rest, the other compression spring 44, 43 is still prestressed.

The cover 33 is permanently exposed to forces which result from the prestressed load of the compression springs 43, 44 and which slightly exceed the frictional forces maximally occurring between the damping element 34 and the tappet 18. To this end, the outer edge 46 of the cover 33 is provided with an annular groove 47, to which is allocated an annular ring 48 projecting from the annular cylindrical housing 31 in the direction toward the axis 21. After insertion of the compression spring 43, the damping element 34 and the compression spring 44 in the damping housing 30, the cover 33 is put on and elastically locked into engagement with the annular ring 48. This is possible due to the fact that the cover 33 too consists of an elastic plastic material. When the cover 33 is locked into place, the two compression springs 43, 44 are prestressed.

The embodiment according to FIGS. 5 and 6 differs from the embodiment according to FIGS. 3 and 4 only in the way the cover 33' is fixed to the housing section 31'. All the other parts are identical so that identical reference numerals are used in FIGS. 5 and 6, there being no need of renewed description. On the outside of the annular cylindrical housing section 31' of the damping housing 30', retaining projections 49 are formed, to which correspond clips 50 formed on the cover 33'. When the cover 33' is mounted in the way described, then the clips 50 slide over the retaining projections 49, backing them up elastically, whereby the cover 33' is firmly, but releasably united with the housing section 31'. The housing 12 is provided with vents 51.

What is claimed is:

1. A frictional damper for a spinner-type washing machine, comprising a tubular housing (12) having a first end and a second closed end and an axis (21), a tappet (18) guided displaceably in the housing (12) and projecting over the first end of the housing (12) and having a free end outside the housing (12) and an end inside the housing (12), articulation elements (15, 19) mounted on the second end of the housing (12) and on the free end of the tappet (18), a damping housing (30) formed on the first end of the housing (12) and provided with a first abutment (32) and a second abutment (33, 33'), a damping element (34) provided with annular stop flanges (37) between which a friction lining (39) is disposed, bearing with a frictional adhesion against the tappet (18), the annular stop flanges (37) having a fixed distance from each other in the direction of the axis (21) and disposed in the damping housing (30) displaceably between the first and second abutments (32, 33, 33') in the direction of the axis (21), and a first and a second compression spring (43, 44) the first compression spring (42) being supported on the first abutment (32) and a first side of the damping element (34) and the second compression spring (43) being supported on the second abutment (33,33') and a second side of the damping element (34) and the first and second compression spring (43, 44) being prestressed with a prestressing load.

2. A frictional damper according to claim 1, wherein the compression springs are helical compression springs (43, 44).

3. A frictional damper according to claim 1, wherein the compression springs (43, 44) are of identical design.

4. A frictional damper according to claim 1, wherein the prestressing load of the compression springs (43, 44), in a central position of the damping element (34), is approximately equal to the frictional adhesion between the damping element (34) and the tappet (18).

5. A frictional damper according to claim 1, wherein the length (s) of maximal displacement of the damping element (34) out of a central position of rest in the damping housing (30, 30') is greater than the amplitude in the case of supercritical speed of the washing machine.

6. A frictional damper according to claim 1, wherein the compression springs (43, 44) are prestressed in such a way that when the first compression spring (43) is completely compressed, the second compression spring (44) is approximately, but not entirely, released.

7. A frictional damper according to claim 2, wherein at least one helical compression spring (43, 44) is partially disposed and supported in an annular recess (40, 41) of the damping element (34).

8. A frictional damper according to claim 7, wherein both helical compression springs (43, 44) are disposed in recesses (40, 41) of the damping element (34) that are separated from each other by an annular rib (42).

9. A frictional damper according to claim 7, wherein the at least one helical compression spring (43, 44), in a completely compressed condition, is located substantially, but not entirely in the recess (40, 41).

10. A fictional damper according to claim 2, wherein the abutment for the first helical compression spring (43) is formed by a stop collar (32) of the damping housing (30, 30') and the abutment for the second compression spring (44) is formed by an annular cover (33, 33') joined to the damping housing (30, 30').

11. A frictional damper according to claim 10, wherein the cover (33, 33') is elastically locked into engagement with the damping housing (30, 30').

* * * * *

UNITED STATES PATENT AND TRADEMARK OFFICE
CERTIFICATE OF CORRECTION

PATENT NO. : 5,961,105
DATED : Oct. 5, 1999
INVENTOR(S) : Ehrnsberger et al.

It is certified that error appears in the above-identified patent and that said Letters Patent is hereby corrected as shown below:

Cover page, column 1, line [30], delete "195 15 010" and insert therefor --196 15 010--.

Signed and Sealed this

Twenty-first Day of March, 2000

Attest:

Attesting Officer

Q. TODD DICKINSON

Commissioner of Patents and Trademarks